United States Patent [19]

Matti

[11] Patent Number: 4,464,445

[45] Date of Patent: Aug. 7, 1984

[54] BATTERY PACK CARTRIDGE

[76] Inventor: David M. Matti, 1933 Windward La., Hanover Park, Ill. 60103

[21] Appl. No.: 494,405

[22] Filed: May 13, 1983

[51] Int. Cl.³ .............................................. H01M 2/10
[52] U.S. Cl. ..................................... 429/99; 429/100; 429/159
[58] Field of Search .................... 429/100, 99, 96, 159

[56] References Cited

U.S. PATENT DOCUMENTS

| | | | |
|---|---|---|---|
| 2,209,185 | 7/1940 | Bower et al. | 429/159 |
| 3,776,778 | 12/1973 | Azuma | 429/159 |
| 3,887,394 | 6/1975 | Kaye | 429/99 |
| 3,967,979 | 7/1976 | Kaye | 429/99 |
| 4,091,187 | 5/1978 | Kaye | 429/100 X |
| 4,123,598 | 10/1978 | Hammel | 429/159 |
| 4,146,682 | 3/1979 | Nakao | 429/100 X |
| 4,213,078 | 7/1980 | Ferrell | 429/100 X |
| 4,221,450 | 9/1980 | Sears | 429/100 X |
| 4,389,469 | 6/1983 | Nicholls | 429/100 X |

*Primary Examiner*—Charles F. LeFevour
*Attorney, Agent, or Firm*—Douglas B. White

[57] ABSTRACT

There is provided a battery pack cartridge for holding rechargeable batteries in a portable personal attachment having an electrical wire with connector to provide separable electrical connection to the electronic device. In an alternative embodiment the connection to the device, may be comprised of dummy battery inserts bearing electrical connections to said interconnecting wire.

3 Claims, 3 Drawing Figures

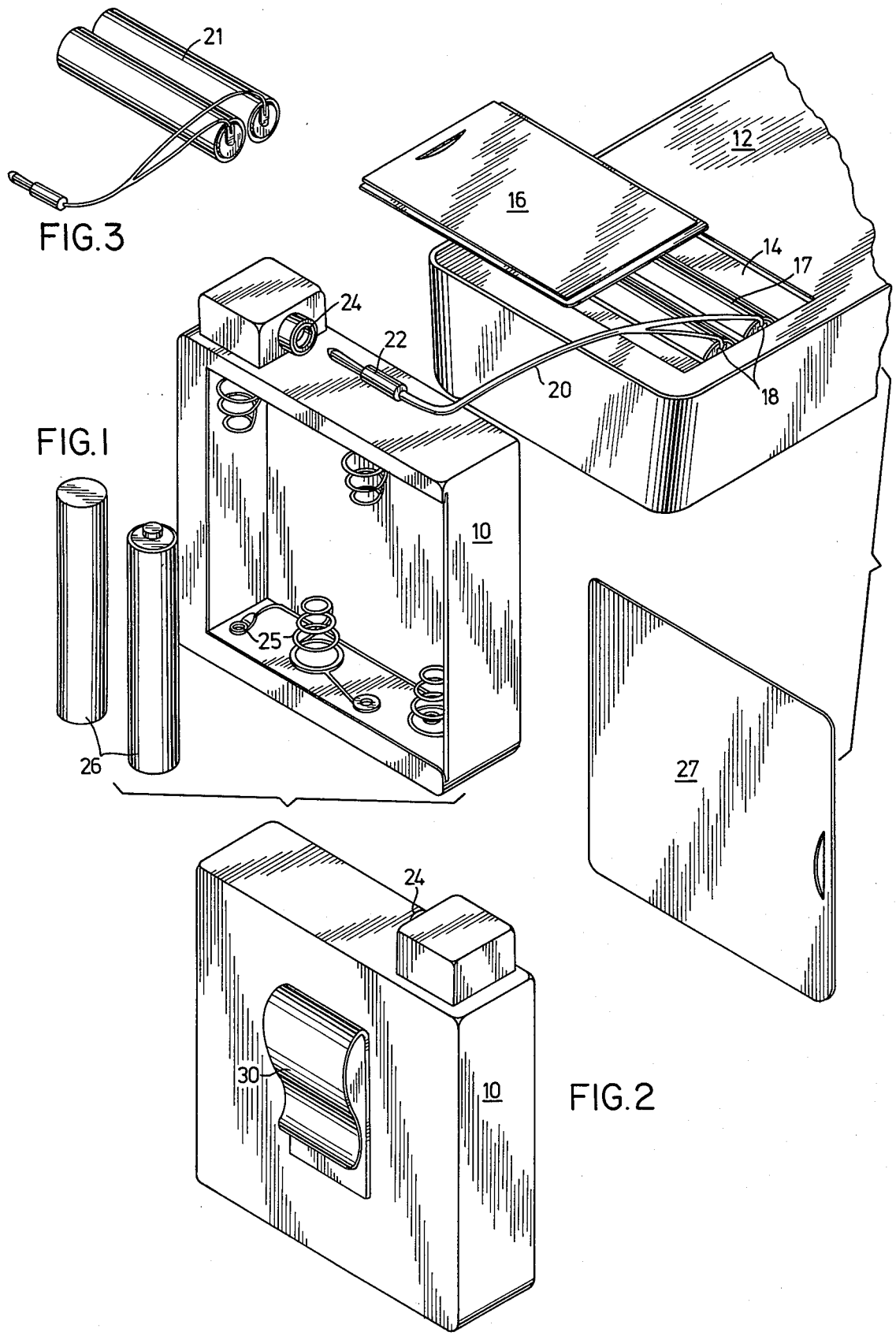

BATTERY PACK CARTRIDGE

BACKGROUND OF THE INVENTION

This invention relates to battery packages, and more particularly to battery cartridges constructed to permit simple connection to portable devices such as cameras or radios and which allows periodic recharging and the use of rechargeable batteries.

In small portable electrical devices, such as radios, power is provided by standard non rechargeable batteries due to size, weight and design constraints of the existing manufacturing processes. Accordingly, a large number of expensive batteries must be purchased to constantly replace exhausted conventional batteries used therein. It has long been an object of the prior art to use rechargeable batteries where possible to reduce cost and minimize battery change. Previously, rechargeable batteries have not been available for use with portable radios or the like since these devices were designed for non rechargeable batteries and rechargeable batteries are of different and usually larger dimensions. Further, no methods have been developed in the prior art for adapting rechargeable batteries to these portable devices.

In the prior art, battery packs have been developed, and more particularly, the U.S. patent issued to Kaye, U.S. Pat. No. 4,091,187, provides an improved battery pack having as its improvement an opening in the wall with protruding battery terminals for improved assembly. In an earlier patent issued to Kaye, U.S. Pat. No. 3,887,394, he provides a device for holding a collection of electric batteries for insertion into the radio or other device, as a cartridge unit. In yet another patent issued to Kaye, U.S. Pat. No. 3,967,979, he provides a similar battery cartridge which may be inserted into the electronic device and the proper polarity achieved whether the case is applied right side up or inverted. In yet another improvement, there is provided a patent to Azuma, U.S. Pat. No. 3,776,778, providing an improved dry cell unit wherein portions of the leads which are to be brought into contact with the terminals of the dry cells are fixed on plates which are then connected when pressed against the contact portions of the dry cell. Lastly, in the U.S. Patent issued to Hammel, U.S. Pat. No. 4,123,598, a battery pack was attempted with a rechargeable battery using fitted molded trays to form a compact container for rechargeable batteries. None of this prior art attempts to use standard, readily available rechargeable batteries and adapt same for use in popular radios, communication devices, cameras, or the like designed to accept only non rechargeable batteries.

The preferred embodiment of the present invention comprises a battery pack cartridge for holding rechargeable batteries in a portable personal attachment, an electrical wire with connector provides separable electrical connection to the electronic device, while the connection to the device, in an alternative embodiment, may be comprised of dummy battery inserts bearing electrical connections to said interconnecting wire.

It is therefore an object of the present invention to provide a battery pack for rechargeable batteries which will be adaptable to all modern portable electronic devices.

It is a further object of the present invention to provide a battery pack for rechargeable batteries which is easily portable and interchangeable between electronic devices.

Other objects and advantages of the invention will become apparent upon reading the following detailed description and upon reference to the drawings in which;

FIG. 1 is a perspective view of the preferred embodiment of the present invention showing the battery pack and the connector to the electronic device.

FIG. 2 is a perspective view of the reverse side of the battery pack of FIG. 1.

FIG. 3 is a perspective view of a connection insert of the present invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Turning now to FIG. 1 there is shown a battery pack 10 in accordance with the present invention adapted to be electrically connected to the electronic device, which is a portable radio or the like 12. Located within the electronic device is a battery holding area 14 enclosed by a sliding door member 16. In normal operation this battery compartment holds non rechargeable batteries 17 of a predesigned and designated size arranged to contact positive and negative terminals 18 for operation of said device. In electrical contact with these terminals there is provided a wire connector 20 which may be either permanently soldered to said connections, fitted thereto with detachable connectors, or fitted to dummy batteries 21 (FIG. 3) for insertion into the said electrical device to provide the electrical connection. Regardless of the method that is used, this electrical connector is provided with a detachable connection 22 at its extremity for electrical mating connection with the electrical connector 24 on said battery pack.

Positive and negative connections are provided to said battery pack electrical connection 24 through internal wiring from battery connections 25 within said pack. Within the pack the positive and negative connections are arranged to put the rechargeable batteries 26 in series in accordance with customary wiring connection with the ultimate positive and negative leads running to said battery pack electrical connection 24.

This battery pack, in its preferred embodiment, is made of a light weight metal or plastic material and arranged with a sliding door 27 similar to that of the electric device to make said batteries easily insertable. On the reverse side of said battery pack there is provided a belt clip 30 to provide easy portability of said battery pack in conjunction with said portable electronic device. In use the battery pack can be carried on the belt and connected to a portable radio, and thereby conserve the cost of replacement batteries or as a back up for present batteries. The battery pack can also be disconnected and connected to other electronic devices such as cameras or communication devices thereby providing a universal powerpack.

Accordingly, there has been shown and described an improved battery pack having a universal connection feature not found in the prior art. This facilitates the use of rechargeable batteries for the operation of popular portable electronic devices, providing ease of access to said rechargeable batteries as well as convenient interchangeability with separate electronic devices.

What is claimed is:

1. A battery pack cartridge for electrical operation of an electronic device having a battery compartment located therein containing positive and negative electrical connections to the electronic device comprising:

a casing member arranged to hold a battery having positive and negative terminals thereon;

an electrical connector having positive and negative terminals mounted to said casing for providing electrical connection to said positive and negative battery terminals;

a battery shaped insert having positive and negative electrical connectors arranged thereon for electrical connection to the positive and negative electrical connections of the electronic device;

a flexible electrical wire arranged to provide remote separable electrical interconnection between said positive and negative electrical connector terminals and the positive and negative terminals of the battery insert.

2. The battery pack cartridge of claim 1 further comprising attachment means mounted to said casing to assist personal attachment thereof to facilitate portability.

3. The battery pack cartridge of claim 2 wherein said attachment means comprises a belt hook.

* * * * *